(12) United States Patent
Dawson et al.

(10) Patent No.: US 7,979,311 B2
(45) Date of Patent: Jul. 12, 2011

(54) PAYMENT TRANSFER STRATEGIES FOR BANDWIDTH SHARING IN AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/755,788

(22) Filed: May 31, 2007

(65) Prior Publication Data

US 2008/0300997 A1  Dec. 4, 2008

(51) Int. Cl.
*G06Q 40/00* (2006.01)

(52) U.S. Cl. ............................................ 705/26; 705/40
(58) Field of Classification Search .................... 705/26, 705/40

See application file for complete search history.

(56) References Cited

U.S. PATENT DOCUMENTS

| | | | |
|---|---|---|---|
| 5,437,054 A | 7/1995 | Rappaport et al. | |
| 5,490,201 A | 2/1996 | Moberg et al. | |
| 5,953,338 A | 9/1999 | Ma et al. | |
| 6,006,084 A | 12/1999 | Miller et al. | |
| 6,035,281 A | 3/2000 | Crosskey et al. | |
| 6,047,268 A * | 4/2000 | Bartoli et al. | 705/35 |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,522,735 B1 | 2/2003 | Fortman et al. | |
| 6,653,933 B2 | 11/2003 | Raschke et al. | |
| 6,751,196 B1 | 6/2004 | Hulyalkar et al. | |
| 6,810,428 B1 | 10/2004 | Larsen et al. | |
| 6,850,764 B1 | 2/2005 | Patel | |
| 6,941,378 B2 | 9/2005 | Apostolopoulos et al. | |
| 6,954,616 B2 | 10/2005 | Liang et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 | 1/2006 | Wang et al. | |
| 7,016,375 B1 | 3/2006 | Rosenberg et al. | |
| 7,028,096 B1 | 4/2006 | Lee | |

(Continued)

FOREIGN PATENT DOCUMENTS

EP  0999662  5/2005

(Continued)

OTHER PUBLICATIONS

Qui et al., "Bandwidth Allocation in Ad Hock Networks: A Price-Based Approach," 2003, IEEE, pp. 1-10.*

(Continued)

*Primary Examiner* — Lindsay M. Maguire
(74) *Attorney, Agent, or Firm* — William Schiesser; Roberts Mlotkowski Safran & Cole, P.C.

(57) ABSTRACT

Systems and methods for compensating lenders of bandwidth in an ad hoc network and, more particularly, to systems and methods for providing payment strategies for bandwidth sharing in an ad-hoc network. The method comprises establishing an ad-hoc network between a borrower and at least one lender of bandwidth, and providing compensation instructions to compensate the at least one lender of bandwidth for lending the bandwidth to the borrower. The system may be a computer infrastructure for implementing the steps of the method.

41 Claims, 13 Drawing Sheets

U.S. PATENT DOCUMENTS

| | | |
|---|---|---|
| 7,043,225 B1 | 5/2006 | Patel et al. |
| 7,058,014 B2 | 6/2006 | Sim |
| 7,058,387 B2 | 6/2006 | Kumar et al. |
| 7,065,367 B2 | 6/2006 | Michaelis et al. |
| 7,075,890 B2 | 7/2006 | Ozer et al. |
| 7,085,281 B2 | 8/2006 | Thomas et al. |
| 7,089,301 B1 | 8/2006 | Labio et al. |
| 7,130,283 B2 | 10/2006 | Vogel et al. |
| 7,174,385 B2 | 2/2007 | Li |
| 7,224,964 B2 | 5/2007 | Souissi et al. |
| 7,240,015 B1 | 7/2007 | Karmouch et al. |
| 7,257,632 B2 | 8/2007 | Zhang et al. |
| 7,274,658 B2 | 9/2007 | Bornstein et al. |
| 7,310,641 B2 | 12/2007 | Moore et al. |
| 7,340,759 B1 | 3/2008 | Rodriguez |
| 7,376,747 B2 | 5/2008 | Hartop |
| 7,401,153 B2 | 7/2008 | Traversat et al. |
| 7,440,573 B2 | 10/2008 | Lor et al. |
| 7,447,656 B2 | 11/2008 | Parthasarathy |
| 7,450,517 B2 | 11/2008 | Cho |
| 7,450,949 B2 | 11/2008 | Choksi |
| 7,460,549 B1 | 12/2008 | Cardei et al. |
| 7,463,890 B2 | 12/2008 | Herz |
| 7,489,656 B2 | 2/2009 | Guo et al. |
| 7,530,102 B2 | 5/2009 | Moskowitz |
| 7,546,342 B2 | 6/2009 | Li et al. |
| 7,593,333 B2 | 9/2009 | Li et al. |
| 7,788,133 B2 | 8/2010 | Delenda |
| 7,830,834 B2 | 11/2010 | Das et al. |
| 2001/0029182 A1 | 10/2001 | McCann et al. |
| 2002/0053033 A1 | 5/2002 | Cooper et al. |
| 2002/0053082 A1 | 5/2002 | Weaver et al. |
| 2002/0058499 A1 | 5/2002 | Ortiz |
| 2002/0069278 A1 | 6/2002 | Forslöw |
| 2002/0102987 A1 | 8/2002 | Souisse et al. |
| 2002/0110110 A1 | 8/2002 | Tiihonen et al. |
| 2002/0120873 A1 | 8/2002 | Salmivalli |
| 2002/0122410 A1 | 9/2002 | Kulikov et al. |
| 2002/0141358 A1 | 10/2002 | Requena |
| 2002/0145978 A1 | 10/2002 | Batsell et al. |
| 2003/0068975 A1 | 4/2003 | Qiao et al. |
| 2003/0117978 A1 | 6/2003 | Haddad |
| 2003/0120594 A1* | 6/2003 | Shaginaw et al. ............... 705/40 |
| 2003/0137976 A1 | 7/2003 | Zhu et al. |
| 2003/0139180 A1 | 7/2003 | McIntosh et al. |
| 2003/0153338 A1 | 8/2003 | Herz et al. |
| 2003/0235174 A1 | 12/2003 | Pichna et al. |
| 2004/0029553 A1 | 2/2004 | Cain |
| 2004/0064351 A1 | 4/2004 | Mikurak |
| 2004/0100929 A1 | 5/2004 | Garcia-Luna-Aceves |
| 2004/0128231 A1 | 7/2004 | Morita |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0260808 A1 | 12/2004 | Strutt |
| 2004/0264466 A1 | 12/2004 | Huang |
| 2005/0063419 A1 | 3/2005 | Schrader et al. |
| 2005/0153725 A1 | 7/2005 | Naghian et al. |
| 2005/0157661 A1 | 7/2005 | Cho |
| 2005/0169209 A1 | 8/2005 | Miu et al. |
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0034330 A1 | 2/2006 | Iwamura |
| 2006/0085543 A1 | 4/2006 | Hrastar et al. |
| 2006/0095582 A1 | 5/2006 | Nitya et al. |
| 2006/0114853 A1 | 6/2006 | Hasty et al. |
| 2006/0126504 A1 | 6/2006 | Meier et al. |
| 2006/0167784 A1 | 7/2006 | Hoffberg |
| 2006/0176829 A1 | 8/2006 | McLaughlin et al. |
| 2006/0179143 A1 | 8/2006 | Walker et al. |
| 2006/0187858 A1* | 8/2006 | Kenichi et al. ............... 370/254 |
| 2006/0193295 A1 | 8/2006 | White et al. |
| 2006/0224502 A1 | 10/2006 | McGowan |
| 2007/0005797 A1 | 1/2007 | Fontijn et al. |
| 2007/0117537 A1 | 5/2007 | Hui et al. |
| 2007/0140272 A1 | 6/2007 | Gulliksson |
| 2008/0008140 A1 | 1/2008 | Forssell |
| 2008/0040481 A1 | 2/2008 | Joshi et al. |
| 2008/0167982 A1 | 7/2008 | Leo et al. |
| 2008/0281529 A1 | 11/2008 | Tenenbaum et al. |

FOREIGN PATENT DOCUMENTS

| | | |
|---|---|---|
| WO | 9915960 | 4/1999 |
| WO | 03 037009 | 5/2003 |
| WO | 04 001585 | 12/2003 |
| WO | 2006 004628 | 1/2006 |

OTHER PUBLICATIONS

D. Zhu et al., "QoS Aware Wireless Bandwidth Aggregation (QAWBA) by Integrating Cellular and Ad-hoc Networks."

D. Zhu et al., "Using Cooperative Multiple Paths to Reduce File Download Latency in Cellular Data Networks."

Non-final Office Action dated Dec. 24, 2009 in U.S. Appl. No. 11/755,776.

Non-final Office Action dated Jan. 22, 2010 in U.S. Appl. No. 11/755,778.

Non-final Office Action dated Jan. 21, 2010 in U.S. Appl. No. 11/755,808.

Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.

Non-Final Office Action dated Mar. 4, 2010 in U.S. Appl. No. 11/755,775.

Non-Final Office Action dated Mar. 22, 2010 in U.S. Appl. No. 11/755,782.

Non-Final Office Action dated Mar. 18, 2010 in U.S. Appl. No. 11/755,763.

Non-Final Office Action dated Jan. 25, 2010 in U.S. Appl. No. 11/755,771.

Notice of Allowance dated Aug. 25, 2010 in U.S. Appl. No. 11/755,780.

Final Office Action dated Sep. 15, 2010 in U.S. Appl. No. 11/755,782.

Notice of Allowance dated Oct. 12, 2010 in U.S. Appl. No. 11/755,808.

Office Action dated Oct. 29, 2010 in U.S. Appl. No. 11/755,786.

IEEE 802.22, Wireless RANs, 220 pages, Mar. 2006.

Michelini et al, Spectral Sharing Across 2G-3G Systems, IEEE, 5 pages, 2003.

Das et al, A Structured Channel Borrowing Scheme for Dynamic Load Balancing in Cellular Networks, IEEE, 8 pages, 1997.

Final Office Action dated Nov. 26, 2010 in U.S. Appl. No. 11/755,775.

Notice of Allowance dated Dec. 14, 2010 in U.S. Appl. No. 11/755,776.

Office Action dated Jan. 24, 2011 in U.S. Appl. No. 11/755,779.

Office Action dated Mar. 3, 2011 in U.S. Appl. No. 11/755,800.

Final Office Action dated Mar. 25, 2011 in U.S. Appl. No. 11/755,786.

* cited by examiner

PAYMENT TRANSFER STRATEGIES FOR BANDWIDTH SHARING IN AD HOC NETWORKS

CROSS-REFERENCE TO RELATED APPLICATIONS

This application is related to the following copending applications, all of which are incorporated herein by reference in their entireties: Copending application Ser. No. 11/755,808; copending application Ser. No. 11/755,780; copending application Ser. No. 11/755,775; copending application Ser. No. 11/755,779; copending application Ser. No. 11/755,782; and copending application Ser. No. 11/755,800.

FIELD OF THE INVENTION

The invention generally relates to systems and methods for compensating lenders of bandwidth in an ad hoc network and, more particularly, to systems and methods for providing payment strategies for bandwidth sharing in an ad-hoc network.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises establishing an ad-hoc network between a borrower and at least one lender of bandwidth, and providing compensation instructions to compensate the at least one lender of bandwidth for lending the bandwidth to the borrower.

In another aspect of the invention, the method comprises establishing an ad-hoc network between a borrower and at least one lender of bandwidth and setting a compensation schedule between the borrower and at least one lender of bandwidth. The method further includes compensating the at least one lender of bandwidth for lending the bandwidth to the borrower based on the compensation schedule.

In another aspect of the invention, the method comprises providing a payment scheme in an ad hoc network, comprising providing a computer infrastructure being operable to: establish an ad-hoc network between a borrower and at least one lender of bandwidth; and compensate the at least one lender of bandwidth for lending the bandwidth to the borrower.

In another aspect of the invention, a system comprises a server having a database containing data associated with one or more payment instructions for implementation in an ad-hoc network. At least one of a hardware and software component is provided which establishes the ad-hoc network between a borrower and at least one lender of bandwidth, and compensates the at least one lender of bandwidth for lending the bandwidth to the borrower based on the one or more payment instructions.

In another aspect of the invention, a computer program product comprising a computer usable medium having readable program code embodied in the medium is provided. The computer program product includes at least one component to: establish an ad-hoc network between a borrower and at least one lender of bandwidth; and provide compensation instructions to compensate the at least one lender of bandwidth for lending the bandwidth to the borrower.

DETAILED DESCRIPTION OF EMBODIMENTS OF THE INVENTION

The invention generally relates to systems and methods for compensating lenders of bandwidth in an ad hoc network and, more particularly, to systems and method for providing payment strategies for bandwidth sharing in an ad-hoc network. In embodiments, the invention contemplated that the ad-hoc network may be some semi-permanent network. More particularly, the present invention is directed to a method and system for making payments to, or providing compensation for, a lender of bandwidth in an ad hoc network. By using the invention, it is possible to compensate a lender of bandwidth in ad hoc network architectures. The invention can also be implemented for transferring files and searching within any database, over any distributed network or stand-alone server, for example.

By using a compensation scheme for lending bandwidth within an ad hoc network, multiple disparate wireless connections in conjunction with multiple devices using a variety of service providers, for example, can be used to create a single virtual fat pipe for transmission of data over a network. The individuals who share their current connections, i.e., bandwidth, acting as gateway devices, are lenders of bandwidth; whereas, the individuals who require additional bandwidth are borrowers. In this way, a borrower, in need of bandwidth, may borrow bandwidth from lenders in an ad hoc network, utilizing the lender's bandwidth (e.g., cellular connection to the Internet, hotspot connection, etc.) while paying for such services.

System Environment

Figure 1:
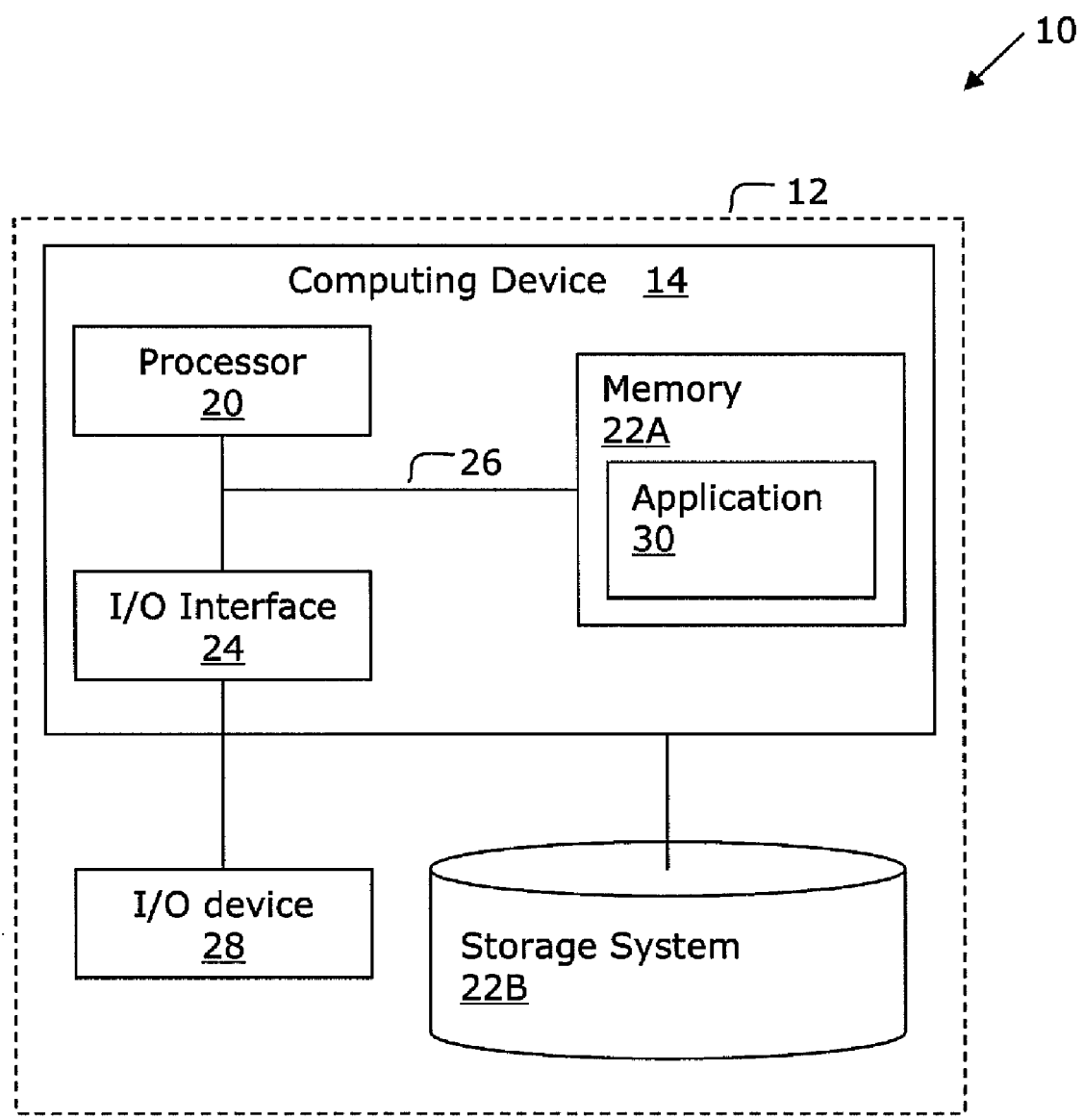
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to permit compensation schemes between borrowers, or their service providers, and lenders, or their service providers, for borrowed bandwidth within an ad hoc network, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

The present invention is directed to systems and methods by which a borrower of bandwidth in an ad hoc network compensates the lender of bandwidth. The specific pricing mechanisms which can be implemented with the invention are disclosed in the following applications, all which are hereby incorporated by reference in their entirety. For example, the negotiation and acceptance of agreed pricing, and the formation and rearrangement of the bandwidth sharing ad hoc networks is set forth in co-pending application Ser. No. 11/755,775. The negotiation and acceptance of agreed pricing, and the formation and rearrangement of lending devices that perform multiplexing functions is set forth in co-pending application Ser. No. 11/755,779. Fixed price offerings are set forth in co-pending application Ser. No. 11/755,782. Market price offerings are set forth in co-pending application Ser. No. 11/755,800.

In general, the invention comprises different payment schemes. For example, in an embodiment of the invention, a lender of bandwidth may directly bill a borrower. In another embodiment, a lender's service provider may bill a borrower. In an another embodiment, a lender's service provider may bill a borrower's service provider and the borrower's service provider may pass the bill through to the borrower. In an another embodiment, a lender's service provider may bill a borrower's service provider and the borrower's service provider may buffer the bill. In an another embodiment, overall bandwidth borrowing between service providers may be periodically reconciled. In an another embodiment, bandwidth may be borrowed by a borrower with no compensation to a lender. In an another embodiment, a multiplexer may directly bill a borrower, or the multiplexer may bill the borrower's service provider. In an another embodiment, a multiplexer may bill a borrower's credit card company or obtain payment from other electronic sources.

In further embodiments, an electronic "token" may be required in order to facilitate payment from the borrower and/or the borrower's service provider to the lender and/or the lender's service provider. This token may be used to authenticate a particular mobile node for billing/financial purposes or other compensation schemes in accordance with the invention. In one option, the token is an identification token, containing no direct means for compensation transfer. In another option, the token may simply be a unique identifier of a user's system, which may then be authenticated through a service so as to provide compensation instructions.

In embodiments, the identification token may be a form of an electronic signature. The identification token would have no value outside the bandwidth sharing system. In further embodiments, the token is a payment token, containing externally recognized account information. For example, the account information may be a credit card account, a bank account, a payment service account, or an on-line payment service account.

Transfer of such a token may be required when compensation exchanges occur. In implementations, the transfer of the token, along with associated "receipt" information may be transparent to the user, although in other options, it may require user intervention or approval before transferring. In either scenario, the "identification token" or "payment token" may serve as a catalyst for permitting compensation schemes.

An optional electronic "notary" service may assist in the bandwidth-sharing transaction of the invention. Although not required, the electronic "notary" service may assist in consummating the transaction, as a witness to the agreed to compensation scheme. In this event, both the lender and the borrower may register with the notary service prior to the substantiation of the ad hoc network. At the conclusion of the bandwidth-sharing ad hoc network session, a multiplexer may be utilized to reconcile account information (compensation) and notify the lender's notary service regarding the transaction between the lender and the borrower. The notary may then follow up with the process of compensation. Of course, the notary may take a percentage from the lender, e.g., five percent, as a fee.

The notary, in embodiments, may be the lender or borrower's service provider, or may be the multiplexing service provider. The notary, in embodiments, may also record the transaction, and notify the lender's service provider, or known payment system, regarding usage of the network. Additionally, the notary, in embodiments, may be linked to other external collection services.

The invention also contemplates the use of leveling payments, or trickle-back payments. These payments may be partial funds transfers, that may be required between a lender and the lender's service provider to provide an equitable distribution of the compensation made by the borrower for borrowed bandwidth. For example, as discussed in more detail below, when a lender is directly compensated by a borrower, the lender's service provider may require a portion of that compensation for services rendered, e.g., using the infrastructure of the service provider. Conversely, when a lender's service provider is directly billing a borrower for compensation, the lender may be entitled to some portion of the compensation because the lender's device was utilized in a bandwidth sharing arrangement. The rules regarding leveling payments may be set forth in the service provider's plan contract.

General Overview of Ad Hoc Networks

In order to utilize compensation mechanisms for sharing bandwidth, an ad hoc network may be created between a borrower node and one or more lender nodes, and a compensation scheme for the shared bandwidth may be established. This process may include both an initial discovery mechanism of the proposed role each node may play, and a negotiation and acceptance of the agreed compensation scheme.

Figure 2:
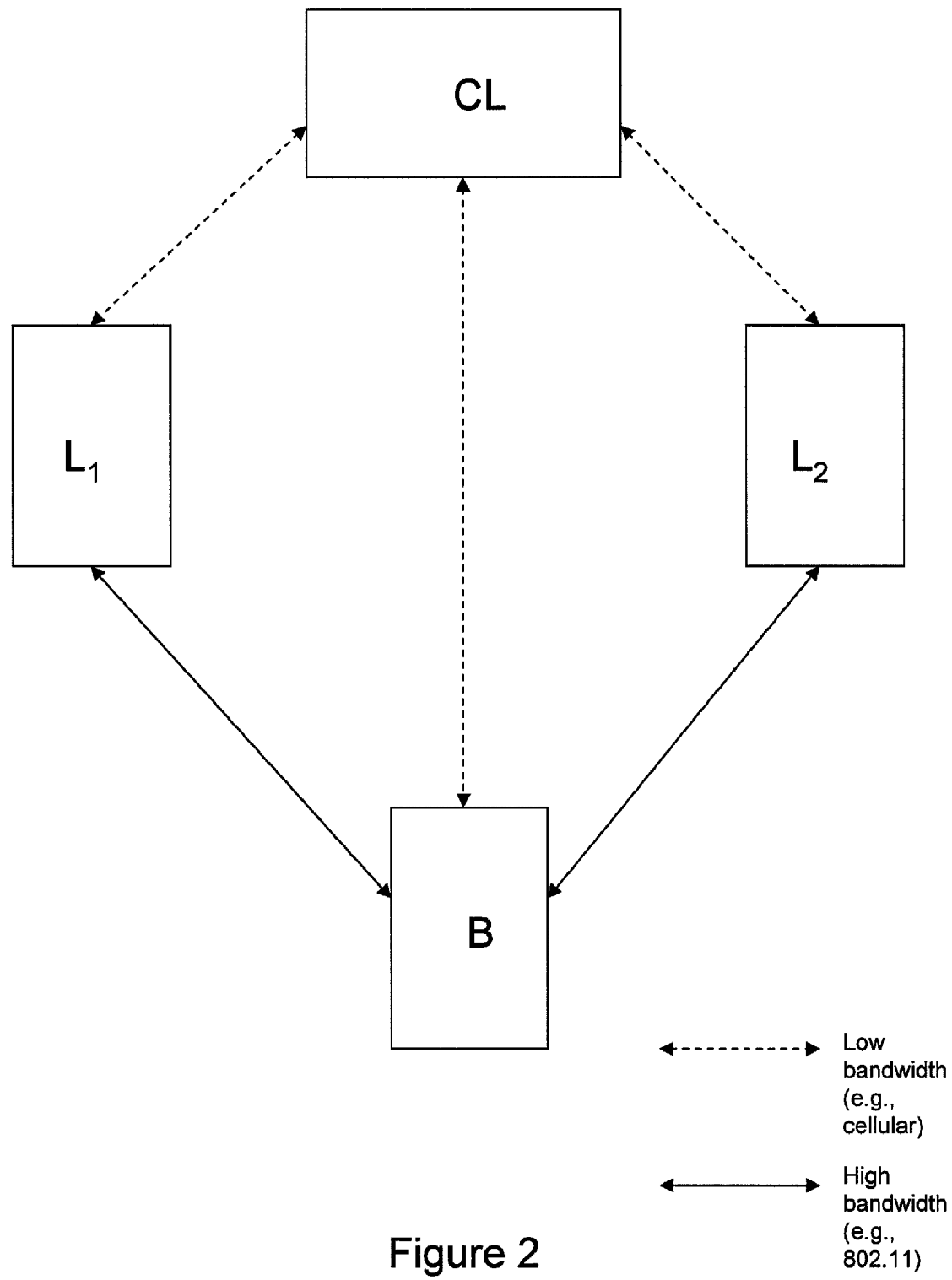
FIG. 2 is an overview of a peer-to-peer bandwidth-sharing ad hoc network.

FIG. 2 is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in co-pending application Ser. No. 11/755,808. In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL, and send this information to the borrower, B, thus effectively increasing the borrower's bandwidth (or distributed locations).

Figure 3:
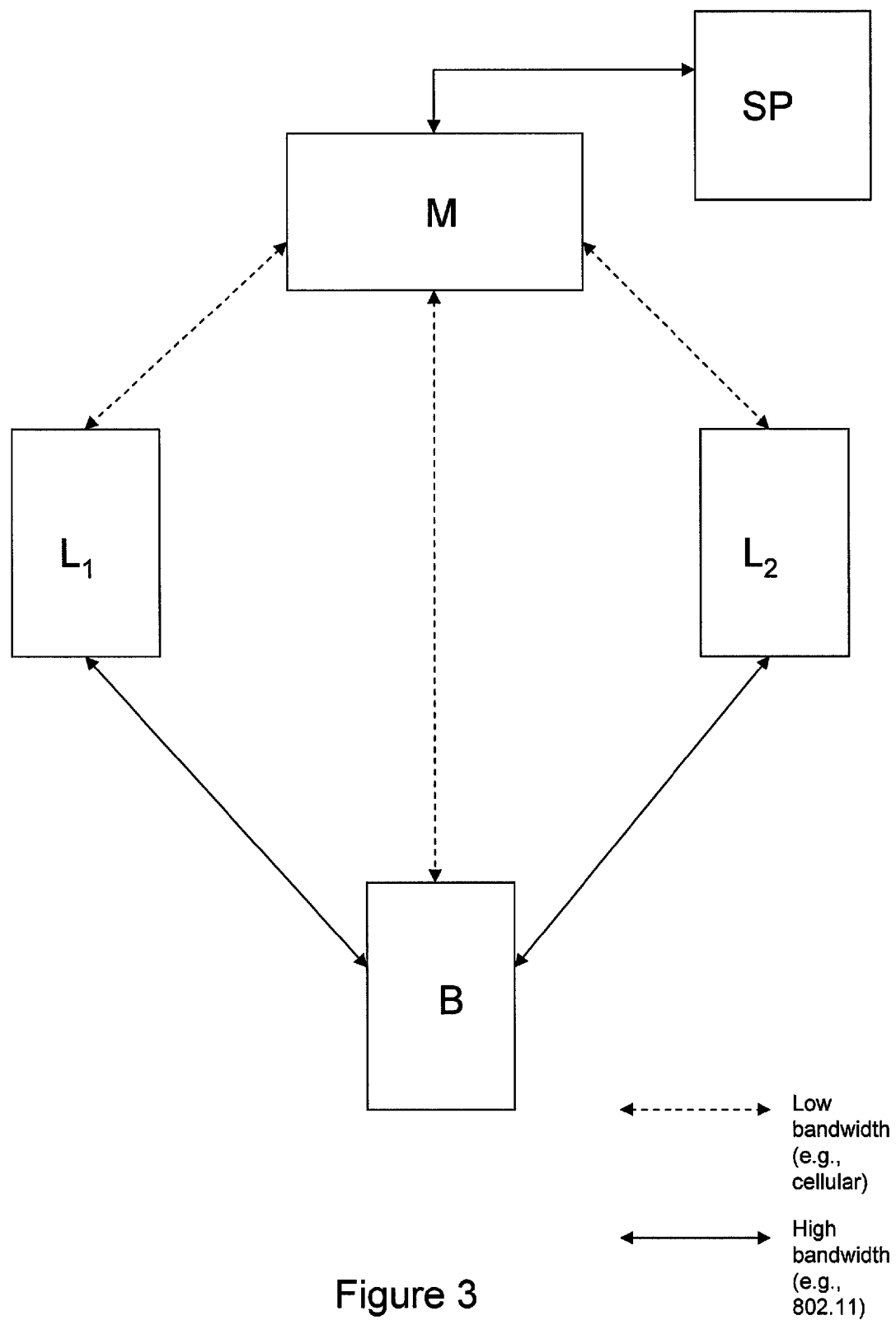
FIG. 3 is an overview of a multiplexer bandwidth-sharing ad hoc network.

FIG. 3 is a general overview of a multiplexed gateway bandwidth sharing architecture which may be implemented with the invention. An illustrative multiplexed, gateway bandwidth sharing architecture is set forth in co-pending application Ser. No. 11/755,780. In this implementation, a borrower B will request a multiplexer M to set up an ad-hoc network. The multiplexer M may communicate with a service provider SP and connect to one or more lenders, $L_1$ and $L_2$, via a wireless network. Once a network is established, the multiplexer will manage the network, including the bandwidth allocations provided by each of the lenders, for example.

State Diagrams

The steps of the state diagrams described herein may be implemented in the environment of FIG. 1 to provide compensation instructions for compensating one or more lenders sharing bandwidth in an ad hoc network. In each of the embodiments, described below, a bandwidth sharing agreement may be reached on data, quality of service (QoS) and associated costs. This agreement may include compensation instructions for compensating one or more lender of bandwidth in the ad hoc network.

The state diagrams may equally represent flow diagrams or a high-level block diagram of the invention. The steps of the state diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements includes firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

Compensation Option 1

Figure 4:
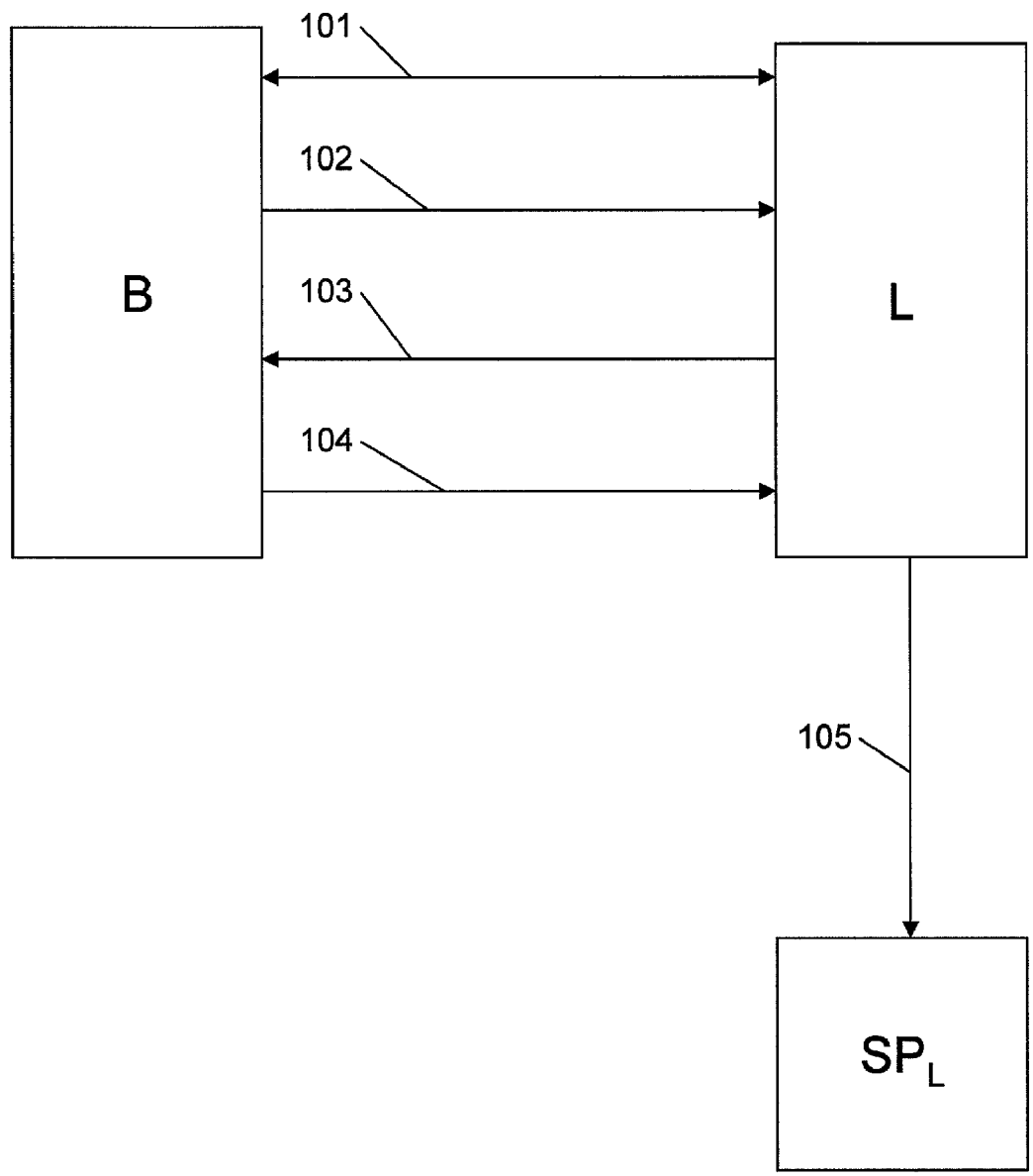
FIG. 4 is a state diagram showing steps for implementing a first aspect of the invention.

FIG. 4 shows a state diagram implementing a first option in accordance with the invention. More particularly, FIG. 4 represents a process, in a non-multiplexed, peer-to-peer connection, in which the lender charges the borrower directly. The methodology may require that a unique identifier, either the identification token or the payment token previously identified, be passed from the borrower's system to the lender's system in order to complete the transaction.

At step 101, a bandwidth sharing agreement may be reached on data, quality of service (QoS) and associated costs. At step 102, a payment token may be passed to the lender L from the borrower B. At step 103, the bandwidth is shared. Upon completion of the bandwidth sharing, the borrower's account may be debited through a direct funds transfer via the account information contained in the payment token, at step 104. Leveling payments (i.e., trickle-back payments) may pass from the lender L to their service provider $SP_L$, depending on plan options at step 105.

Compensation Option 2

Figure 5:
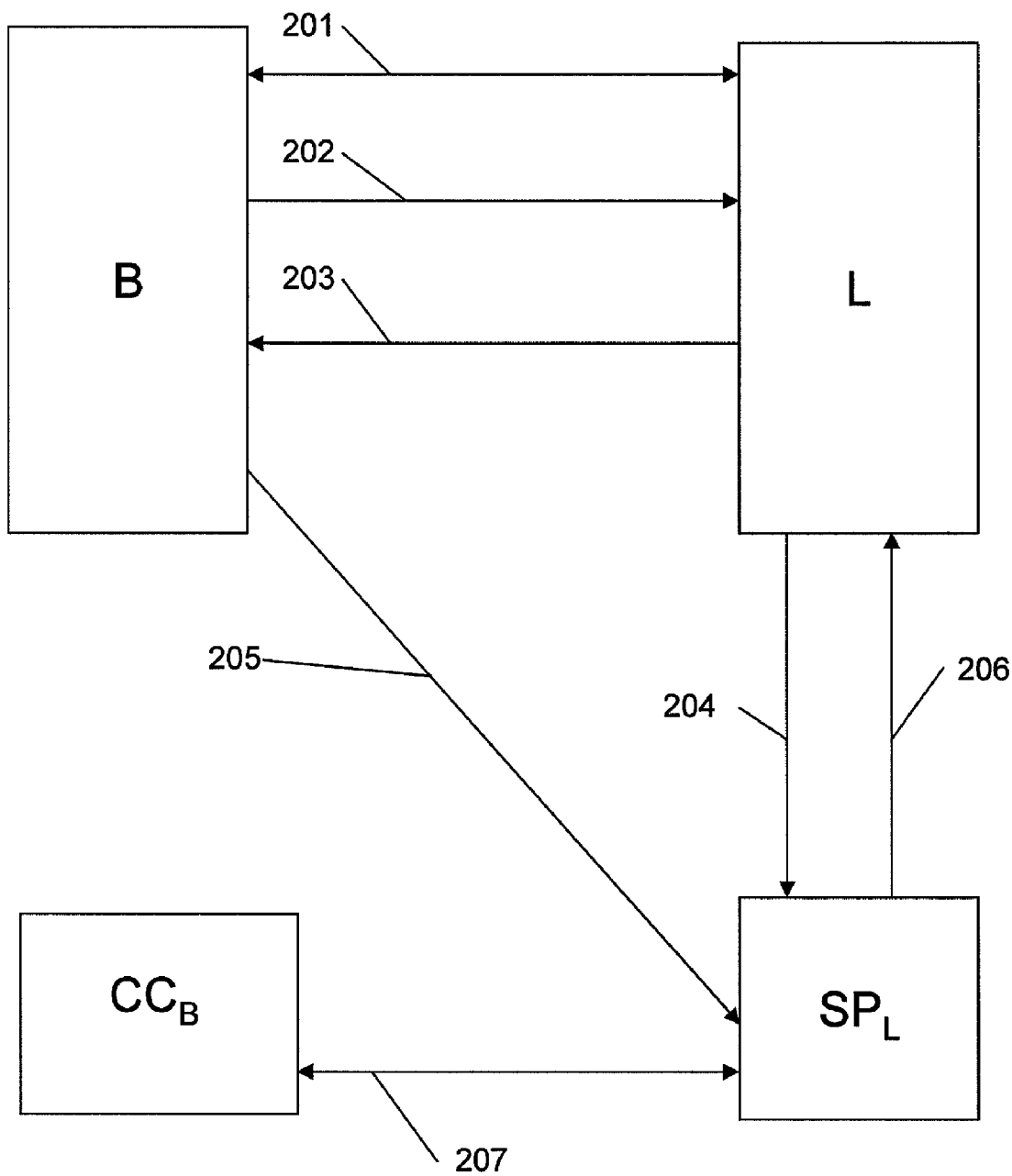
FIG. 5 is a state diagram showing steps for implementing a second aspect of the invention.

FIG. 5 shows a state diagram implementing a second option in accordance with the invention. More particularly, FIG. 5 represents a process, in a non-multiplexed, peer-to-peer connection, in which the lender's wireless service provider $SP_L$ charges the borrower B directly. In this option, at step 201, a bandwidth sharing agreement may be reached on data, QoS, and associated costs. At step 202, an identification token is passed from the borrower's device to the lender's device. At step 203, the bandwidth is shared.

Upon completion of the bandwidth sharing for the prescribed price, the information in the identification token and a transaction receipt may be passed back to the lender's service provider, at step 204. The identification token may be passed from the lender L to the lender's service provider $SP_L$ prior to completion of the bandwidth sharing.

At step 205, the lender's service provider $SP_L$ directly bills the borrower B accordingly, using the transaction receipt and the identity information obtainable from the identification token. This may be performed through a web service. Lastly, leveling payments (i.e., trickle-back payments) may pass from the lender's service provider $SP_L$ to the lender L, depending on plan options at step 206.

In embodiments, in a non-multiplexed, peer-to-peer connection, the lender's service provider $SP_L$ may charge the borrower's credit card company $CC_B$ or other defined account at step 207. However, in this embodiment, rather than using an identification token, containing user information, a payment token may be implemented with the invention. As previously discussed, the credit card or account information may be embedded in the payment token passed back to the lender's service provider $SP_L$.

Compensation Option 3

Figure 6:
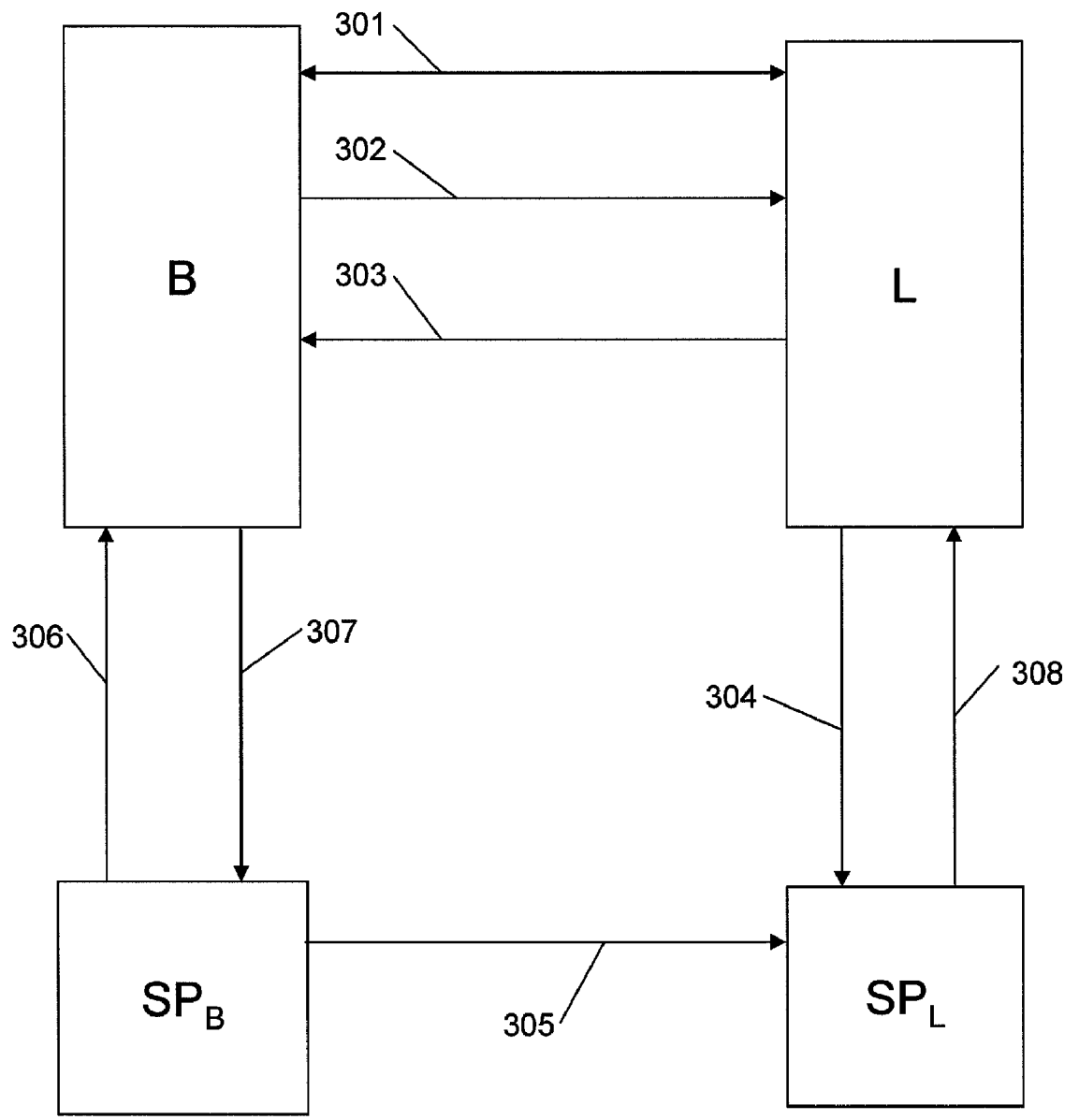
FIG. 6 is a state diagram showing steps for implementing a third aspect of the invention.

FIG. 6 shows a state diagram implementing a third option in accordance with the invention. More particularly, FIG. 6 represents a process, in a non-multiplexed, peer-to-peer connection, in which the lender's service provider $SP_L$ bills the borrower's service provider $SP_B$ for the bandwidth the borrower B has borrowed from the lender L. In this embodiment, the bill (invoice for services) is passed through to the borrower B. Additionally, in this option, the lender's service provider $SP_L$ may bill the borrower's service provider $SP_B$ in a "pass through" mode, where the lender's service provider $SP_L$ may notify the borrower's service provider $SP_B$, and the charges materialize on a regular and periodic bill.

At step 301, a bandwidth sharing agreement may be reached on data, QoS and associated costs. At step 302, an identification token may be passed from the borrower B to the lender L. This identification token may be "redeemable" through the borrower's service provider $SP_B$. Next, bandwidth is shared at step 303. Upon completion of the bandwidth sharing (or prior to completion), the identification token may be passed back to the lender's service provider at step 304. The lender's service provider $SP_L$ may directly bill the borrower's service provider $SP_B$ for the borrowed bandwidth at step 305.

This bill may be passed directly through to the borrower 306, such that the borrower's service provider $SP_B$ acts as a clearing house for the borrower's debts. The borrower B may then pay the bill to the borrower's service provider at step 307. Lastly, leveling payments (i.e., trickle-back payments) may pass between from the lender" service provider $SP_L$ to the lender L, depending on plan options at step 308.

Compensation Option 4

Figure 7:
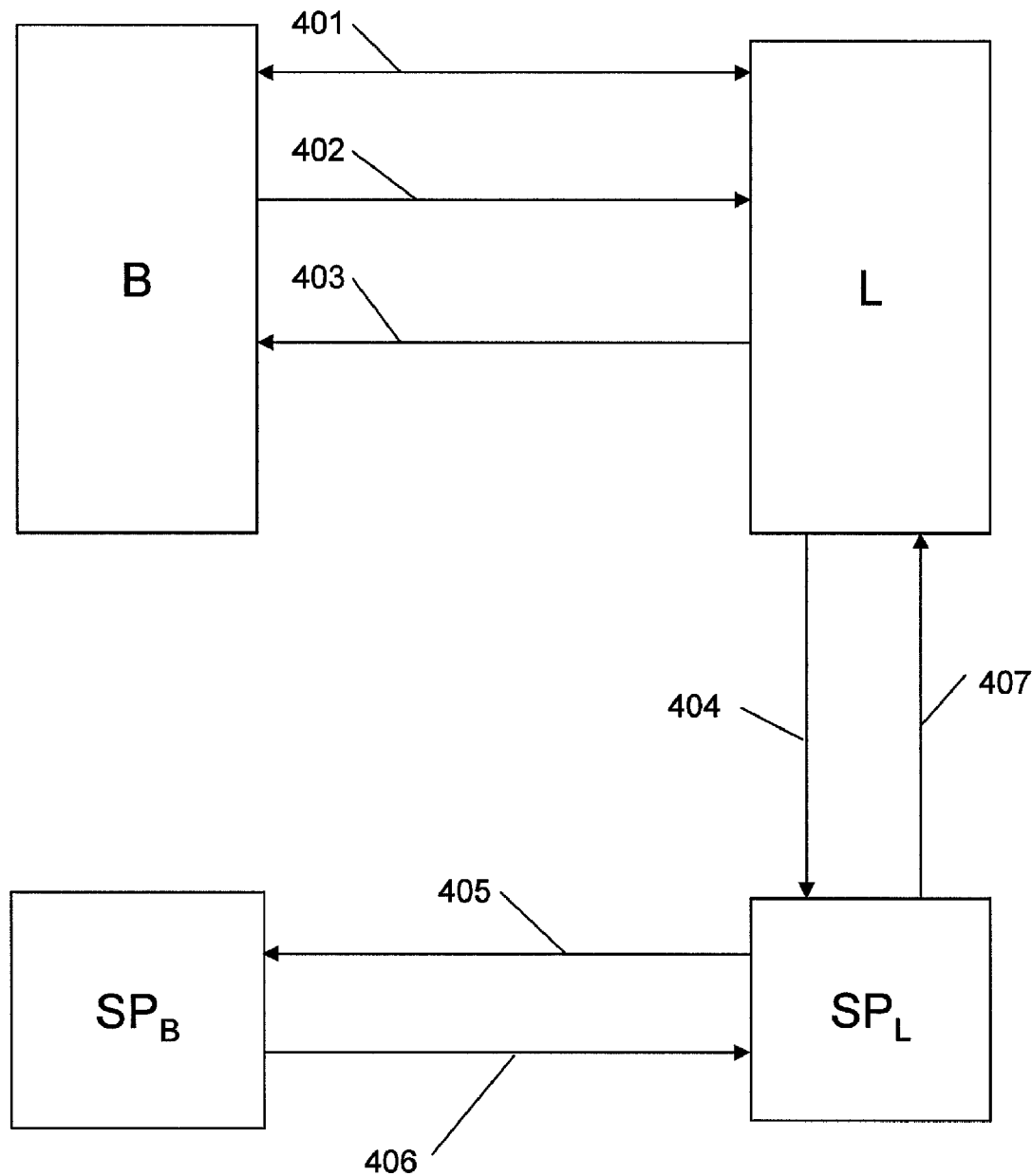
FIG. 7 is a state diagram showing steps for implementing a fourth aspect of the invention.

FIG. 7 shows a state diagram implementing a fourth option in accordance with the invention. More particularly, FIG. 7 represents a process, in a non-multiplexed, peer-to-peer connection, in which the lender's service provider $SP_L$ may charge the borrower's service provider $SP_B$ for the bandwidth the borrower B has borrowed from the lender L. The charge may be buffered, or insulated from the borrower B, and the borrower may receive a discounted rate (or free rate) depending on rate plans and arrangements between the borrower B and its service provider $SP_B$.

At step 401, a bandwidth sharing agreement may be reached on data, QoS and associated costs. An identification token may be passed from the borrower B to the lender L at step 402. The identification token may be "redeemable" through the borrower's service provider $SP_B$. At step 403, the bandwidth is shared. Upon completion of the bandwidth sharing (or prior to completion), the identification token may be passed back to the lender's service provider at step 404. The lender's service provider $SP_L$ may directly bill the borrower's service provider $SP_B$ for the borrowed bandwidth at step 405. At step 406, the borrower's service provider $SP_B$ may compensate the lender's service provider $SP_L$.

This bill may or may not be passed through to the borrower B, depending on the terms of the borrower's contract. For example, the borrower's service provider $SP_B$ may underwrite a certain percentage of the costs, based on the presence of a "premium" contract between borrower and his/her service provider. Leveling payments (i.e., trickle-back payments) may pass from the lender's service provider $SP_L$ to the lender L, depending on plan options at step 407.

Compensation Option 5

Figure 8:
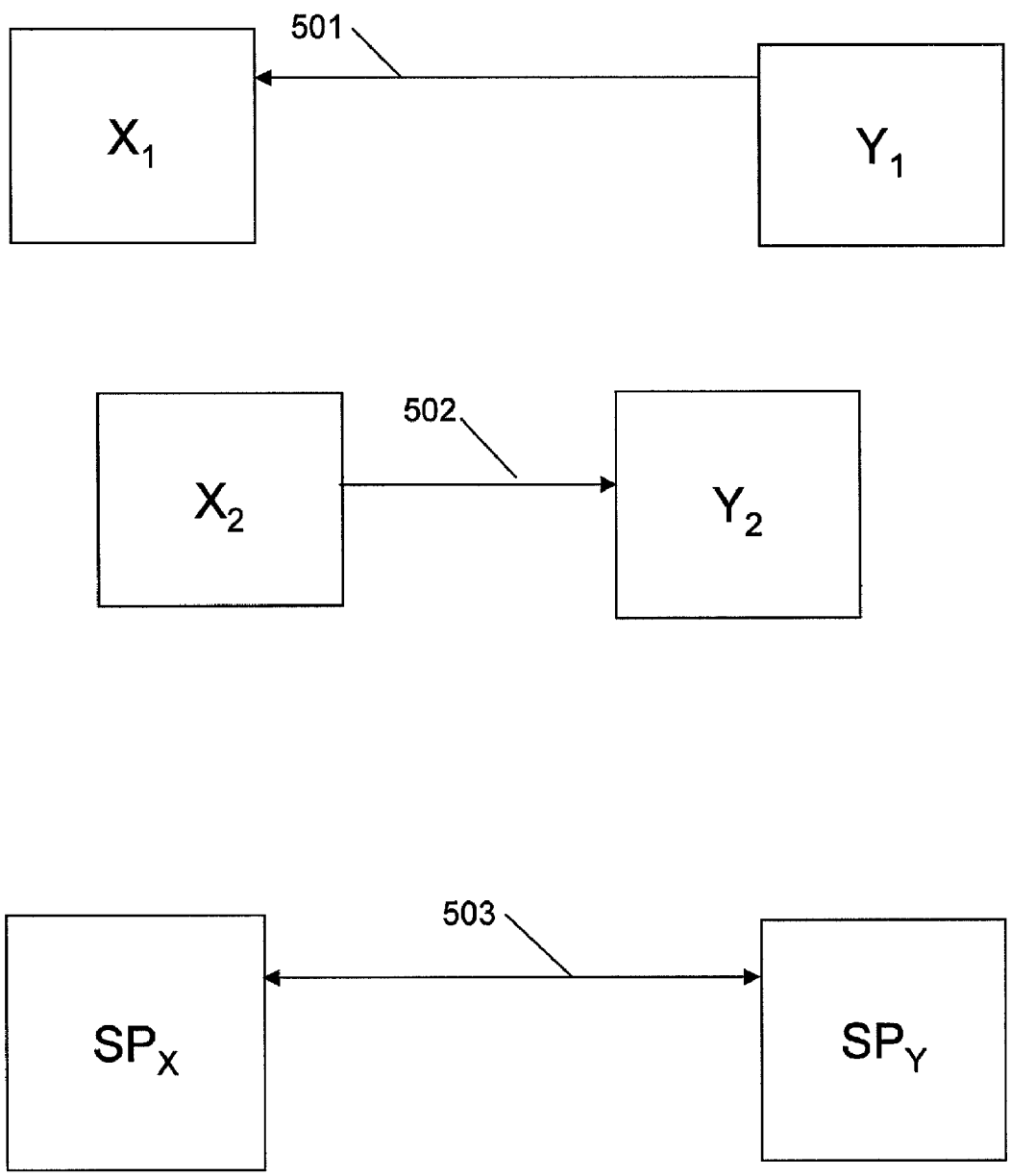
FIG. 8 is a state diagram showing steps for implementing a fifth aspect of the invention.

FIG. 8 shows a state diagram implementing a fifth option in accordance with the invention. More particularly, FIG. 8 represents a process, in a non-multiplexed, peer-to-peer connection, in which balance sheets may be maintained between competing service providers (e.g., $SP_X$ and $SP_Y$) showing relative borrowing and loaning history. Furthermore, FIG. 8 shows a situation of an "even" exchange of relative bandwidth borrowing between the service providers. Periodic reconciliation (e.g., monthly) may be performed in this embodiment.

As shown in FIG. 8, service provider $SP_X$ has two subscribers, $X_1$ and $X_2$, and service provider $SP_Y$ has two subscribers, $Y_1$ and $Y_2$. If, using this model, by way of one example, $X_1$ borrows a net two hours of bandwidth from $Y_1$ at step 501, and $Y_2$ borrows a net two hours of bandwidth from $X_2$ at step 502, then after the periodic reconciliation at step 503 no compensation may be required due to the "even" exchange of bandwidth sharing occurring at the service provider level.

Compensation Option 6

Figure 9:
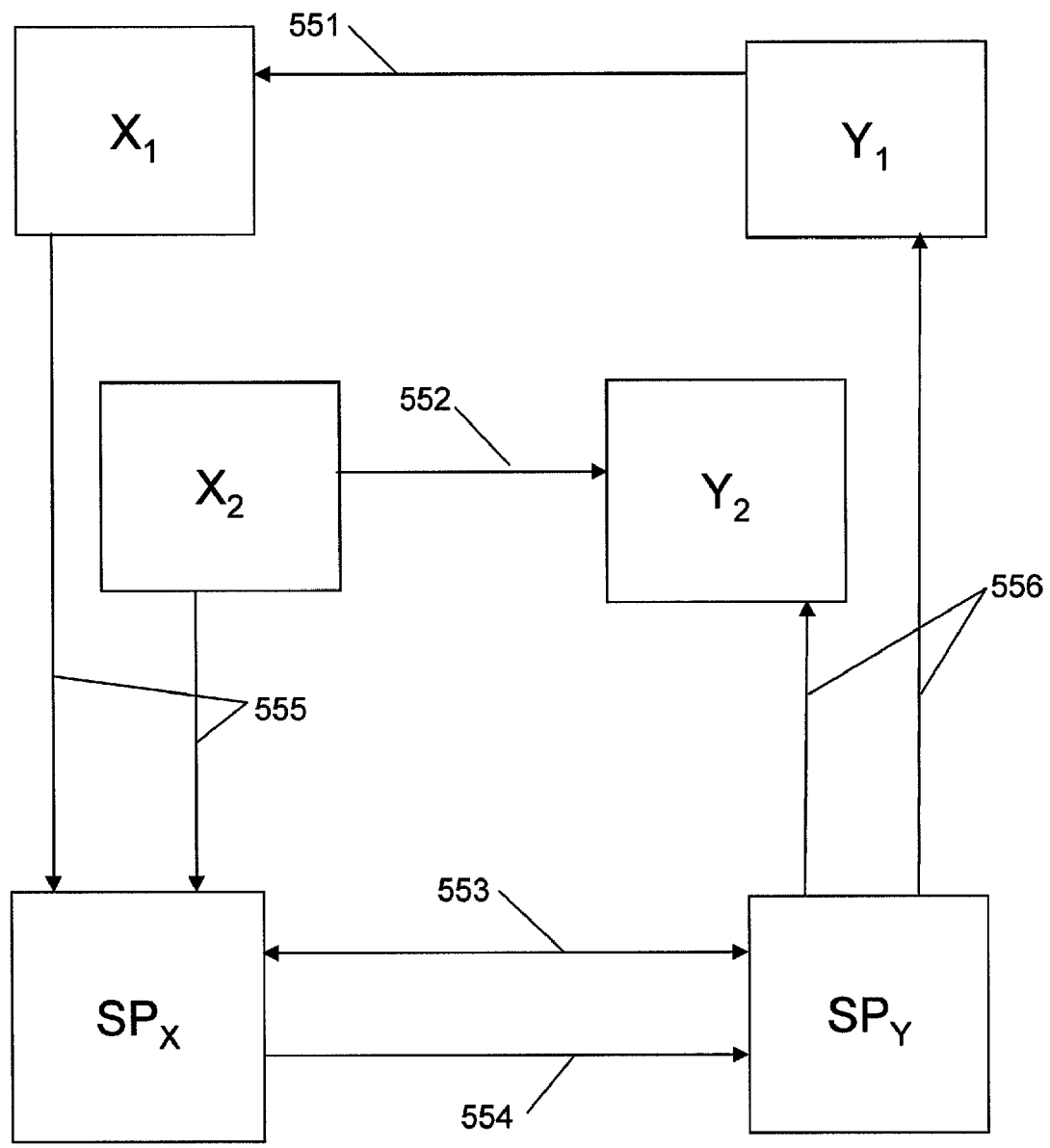
FIG. 9 is a state diagram showing steps for implementing a sixth aspect of the invention.

As a further alternative to the processes of FIG. 8, FIG. 9 shows a situation of an "uneven" exchange of relative bandwidth borrowing between the service providers. As shown in FIG. 9, $X_1$ borrows a net four hours of bandwidth from $Y_1$ at step 551, and $Y_2$ borrows a net two hours of bandwidth from $X_2$ at step 552. At step 553, at periodic reconciliation point (e.g., monthly, weekly, etc.), service provider $SP_X$ determines that their subscribers borrowed net bandwidth of 2 hours from the subscribers of Service Provider $SP_Y$. Such reconciliation may either be performed on a corporate-wide basis, it may be done regionally, or it may be done for all users of a certain subscriber class. The total compensation value of the net bandwidth deficit may be calculated and may be paid from $SP_X$ to $SP_Y$ at step 554.

At step 555, the service provider $SP_X$ may recoup its costs by, for example:
  (i) distribute the cost evenly among all subscribers;
  (ii) distribute the cost among subscribers according to a given user's gross borrowing history for the reconciliation period;
  (iii) distribute the cost among subscribers according to a given user's net borrowing (proportion of borrowing versus lending); and/or
  (iv) distribute the cost to the heavy borrowers according to their delta, or difference, above average borrowing usage.

At step 556, the service provider $SP_Y$ may, for example:
  (i) pocket the payment received from $SP_X$, with no compensation to its subscribers;
  (ii) distribute the payment received evenly among all subscribers;
  (iii) distribute the payment among subscribers according to a given user's gross lending history for the reconciliation period; and/or
  (iv) distribute the payment among subscribers according to a given user's net lending history (proportion of lending versus borrowing) for the reconciliation period.

Compensation Option 7

Figure 10:
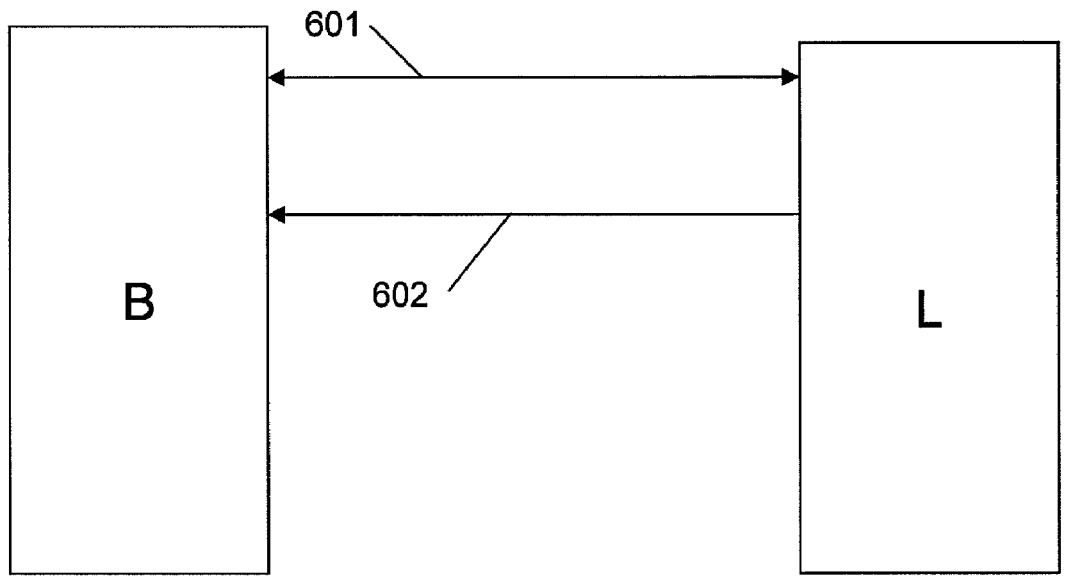
FIG. 10 is a state diagram showing steps for implementing a seventh aspect of the invention.

FIG. 10 shows a state diagram implementing a seventh option in accordance with the invention. More particularly, FIG. 10 represents a process, in a non-multiplexed, peer-to-peer connection, in which no compensation for shared bandwidth occurs. In this egalitarian model, users may opt into a bandwidth sharing coalition and may take and receive bandwidth according to their needs and ability. Users may choose, on their device, the guidelines to put in place for their own bandwidth sharing behavior (e.g., never share; share only when inactive; share only up to a certain predetermined percent of the time; or always share).

More particularly, upon initiating a download, the borrower B may seek out peers in the ad hoc network willing to assist with a planned download at step 601. The system may accomplish the download at step 602 via the borrowed bandwidth, with the assistance of peers accordingly, and with no transfer of compensation.

The business model underpinning this option may vary in scope. Provision of free bandwidth in this fashion may be done in an egalitarian, open source fashion with no profit motive by the responsible parties. Alternatively, costs may be underwritten through advertising inserted into downloaded content. Finally, the free bandwidth business model may be provided in a geographical site such as a store, as a means of maximizing users' download experience.

Compensation Option 8

Figure 11:
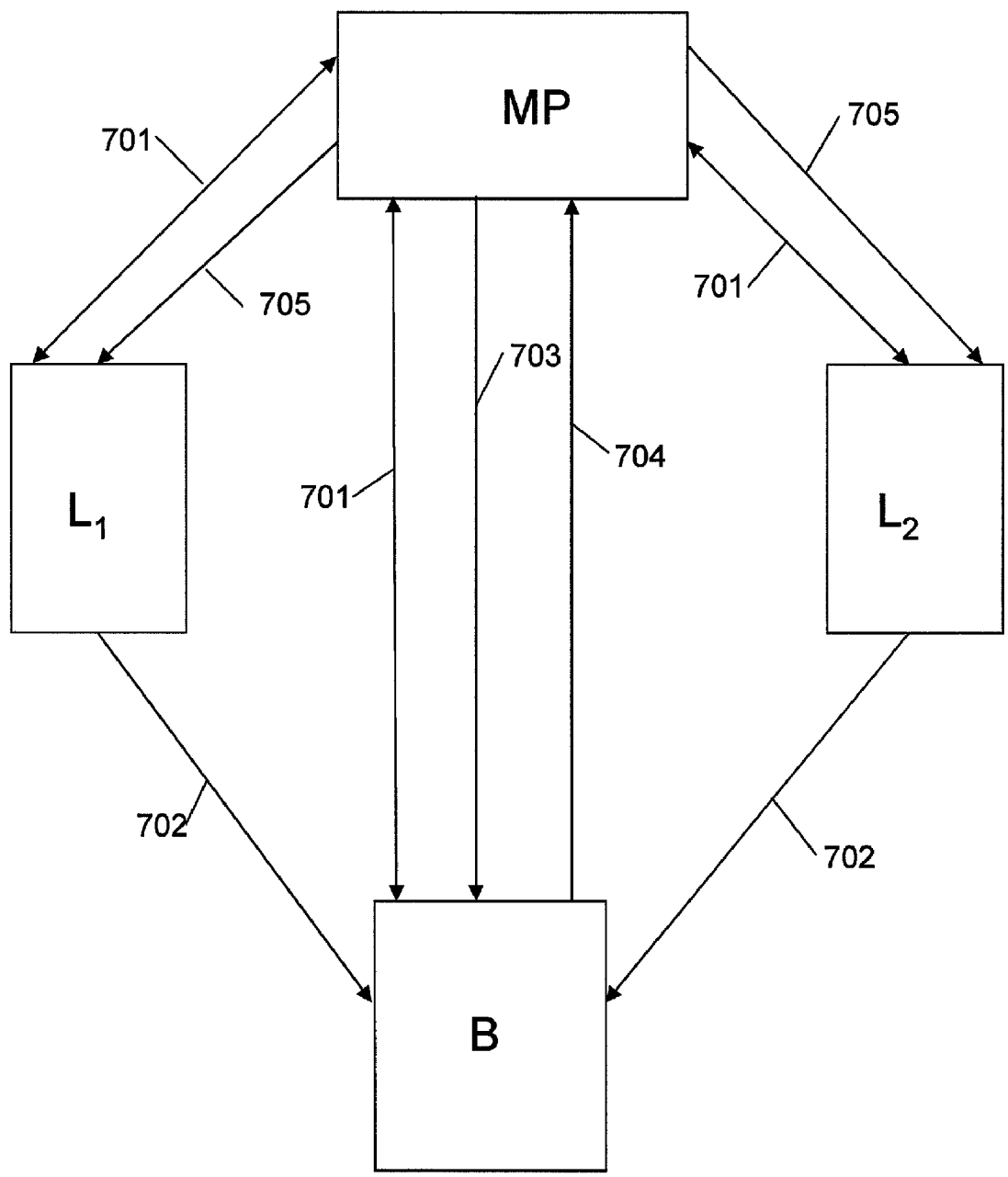
FIG. 11 is a state diagram showing steps for implementing an eighth aspect of the invention.

FIG. 11 shows a state diagram implementing an eighth option in accordance with the invention. More particularly, FIG. 11 represents a process in a multiplexed gateway connection, wherein the multiplexing service provider MP, after debiting the borrower, may take a portion of the compensation (i.e., a middleman's cut), and may give a portion of the compensation to the lenders $L_1$ and/or $L_2$. The multiplexer MP may handle the direct billing.

At step 701, each borrower B and lender $L_1$ and $L_2$ may register with the multiplexing service provider MP. Each borrower and lender may start with a zero balance in their account. At step 702, the bandwidth is shared by a first lender $L_1$ and a second lender $L_2$. The multiplexing service provider MP may debit the borrower's account for the amount he owes for borrowing bandwidth from others. The borrower B may receive a monthly bill for the owed charges at step 703. The borrower B may then pay the multiplexing service at step 704.

At step 705, the multiplexing service provider MP may compensate all the lenders who contributed their bandwidth (based upon the previously agreed upon terms between the lender and the multiplexer, or between the lender and the borrower) after the multiplexing service provider MP takes a portion of the compensation. An individual lender may either allow their compensation to accumulate in an account, or request the multiplexing service provider MP to provide them with the appropriate compensation.

Compensation Option 9

Figure 12:
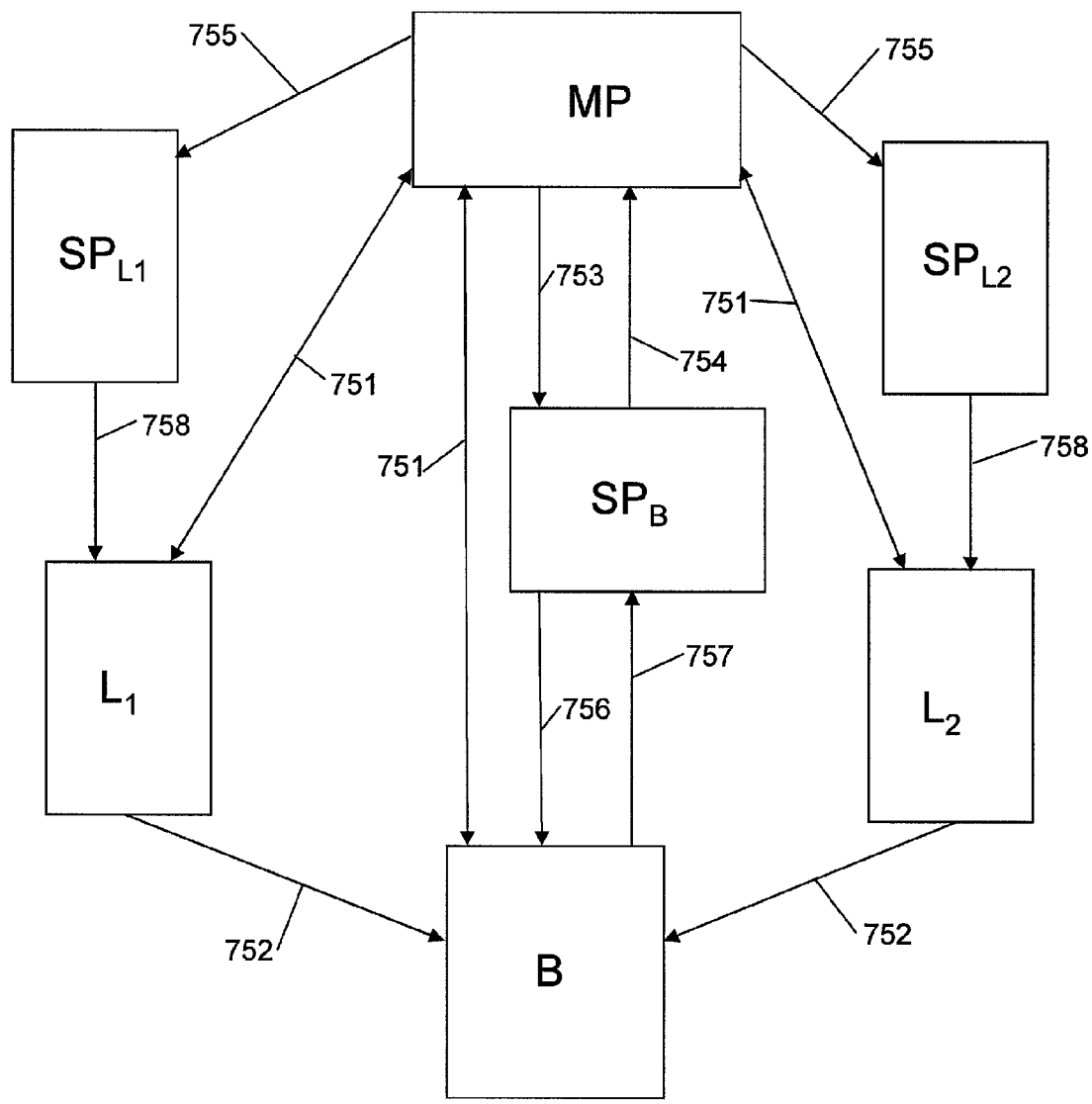
FIG. 12 is a state diagram showing steps for implementing a ninth aspect of the invention.

As a further alternative to the processes of FIG. 11, FIG. 12 shows a process in a multiplexed gateway connection, wherein the multiplexing service provider MP may credit and debit the service providers, rather than the borrowers and lenders themselves. At step 751, each borrower B and lender $L_1$ and $L_2$ may register with the multiplexing service provider. Each borrower and lender starts with a zero balance in their account. At step 752, the bandwidth is shared by a first lender $L_1$ and a second lender $L_2$. At step 753, the multiplexing service provider may bill the borrower's service provider $SP_B$ for the amount the borrower B owes for borrowing bandwidth from lenders $L_1$ and $L_2$. At step 754, the borrower's service provider $SP_B$ may then pay the multiplexing service provider MP.

At step 755, the multiplexing service provider MP may compensate all the lenders (e.g. $L_1$ and $L_2$) who contributed their bandwidth for the amount they each are entitled to (based upon the previously agreed upon terms between the lender and the multiplexer, or between the lender and the borrower) after the multiplexing service provider MP takes a portion of the compensation (i.e., a middleman's fee). At step 756, the borrower's service provider $SP_B$ may then bill the borrower. At step 757, the borrower B may compensate their service provider $SP_B$. Leveling payments (i.e., trickle-back payments) may pass from the lender's service provider to the lender, depending on plan options at step 758.

The steps of FIG. 12, as with the other embodiments, may also utilize the processes of other embodiments. For example, the processes described with reference to FIG. 12 may utilize the "even" or "uneven" exchange of relative bandwidth borrowing schemes.

Compensation Option 10

Figure 13:
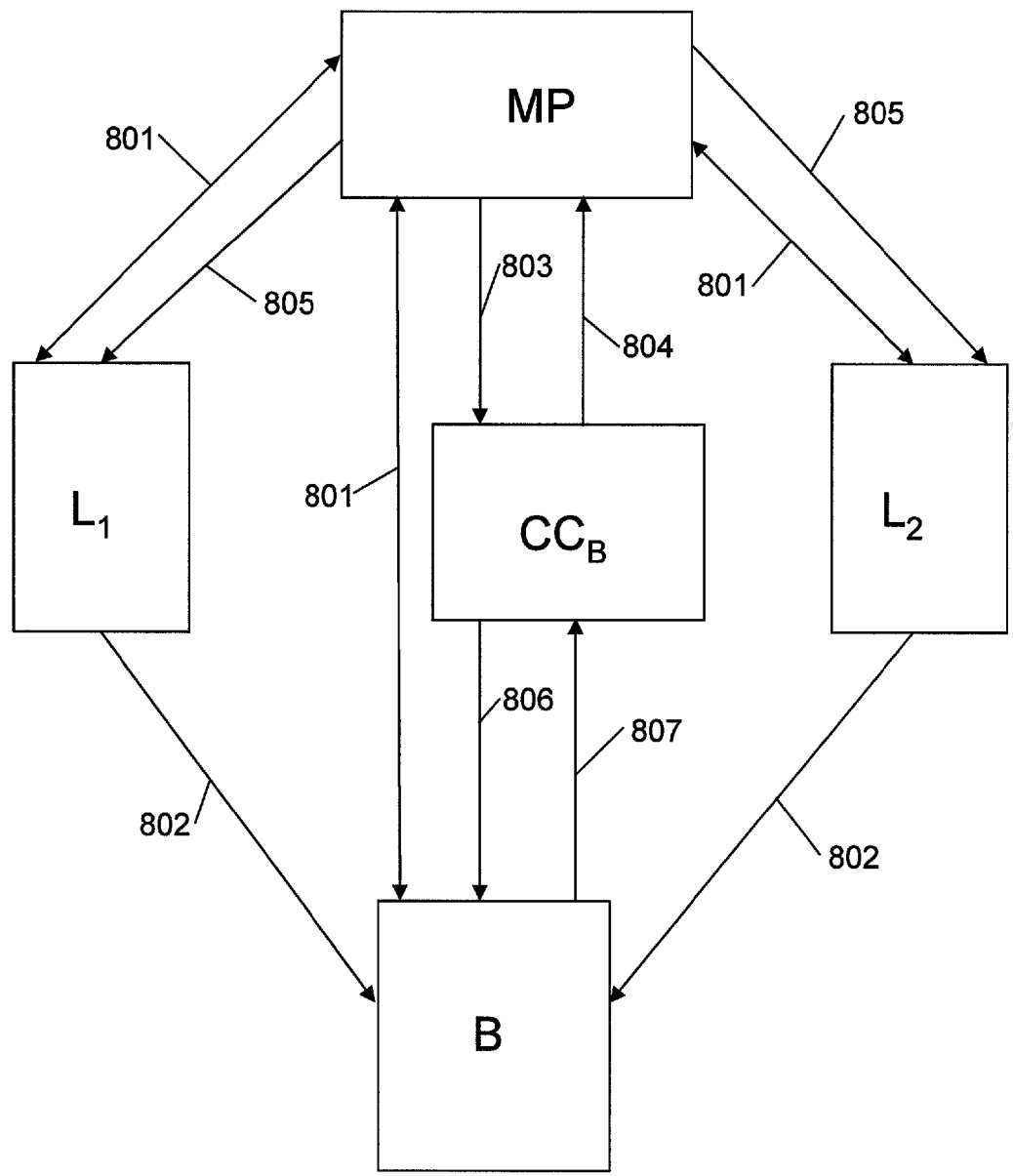
FIG. 13 is a state diagram showing steps for implementing a tenth aspect of the invention.

FIG. 13 shows a state diagram implementing a tenth option in accordance with the invention. More particularly, FIG. 13 shows a process, in a multiplexed gateway connection, wherein the multiplexing service provider MP, after billing the borrower's credit card $CC_B$ on file, may take a portion of the compensation (i.e., middleman's cut), and may compensate the lenders $L_1$ and $L_2$ with a portion of the compensation. In this embodiment, the multiplexing service provider may bill the borrower's credit card company, which may then bill the borrower on a periodic (e.g., monthly) basis.

At step 801, each borrower B and lender $L_1$ and $L_2$ may register with the multiplexing service provider MP. Each borrower and lender starts with a zero balance in their account. At step 802, the bandwidth is shared by a first lender $L_1$ and a second lender $L_2$. At step 803, the multiplexing service provider MP may bill the borrower's credit card company $CC_B$ for the amount of compensation the borrower B owes for borrowing bandwidth from lenders $L_1$ and $L_2$. The borrower's credit card company $CC_B$ may then pay the multiplexing service provider MP at step 804.

At step 805, the multiplexing service provider MP may credit all the contributing lenders (e.g., $L_1$ and $L_2$) for the amount they each are entitled to (based upon the previously agreed upon terms between the lender and the multiplexer, or between the lender and the borrower), after the multiplexing service provider takes a portion of the compensation (i.e., a middleman's fee). The borrower B may receive a bill for the charges he owes from their credit card company $CC_B$ at step 806. At step 807, the borrower B may pay their credit card company $CC_B$.

While the invention has been described in terms of embodiments, those skilled in the art will recognize that the invention can be practiced with modifications and in the spirit and scope of the appended claims. For example, while the embodiments have been described with one or two lenders, those skilled in the art will recognize that the invention can be practiced with any number of lenders. Additionally, while the embodiments have been described with compensation being made between borrowers and lenders, one skilled in the art will recognize that this compensation can take the form of cash, credit for future borrowing of bandwidth with a service provider, other credit with a service provider (e.g., cell phone minutes), kudos points, etc. Additionally, it should be recognized that a combination of any of the above options may be implemented, where appropriate.

What is claimed is:

1. A method, comprising:
    establishing an ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location; and
    providing compensation instructions to compensate the at least one lender of bandwidth for lending the bandwidth to the borrower,
    wherein the providing the compensation instructions comprises providing payment transfer strategies comprising billing one of the borrower, a service provider of the borrower, and a borrower's credit card company or service for bandwidth sharing in the ad-hoc network.

2. The method of claim 1, wherein the compensation instructions comprises directly billing the borrower.

3. The method of claim 1, wherein the compensation instructions comprises a lender's service provider billing the borrower.

4. The method of claim 1, wherein the compensation instructions comprises a lender's service provider billing a borrower's service provider, wherein the borrower's service provider passes the billing to the borrower.

5. The method of claim 1, further comprising periodically reconciling overall bandwidth borrowing between service providers of the borrower and the at least one lender.

6. The method of claim 5, further comprising recouping costs for the borrowed bandwidth by at least one:
    (i) distribute a cost evenly among all subscribers;
    (ii) distribute the cost among subscribers according to a user's borrowing history for a period of time; and
    (iii) distribute the cost based on a difference above an average borrowing usage.

7. The method of claim 1, wherein the compensation instructions comprises a multiplexer one of directly billing the borrower and billing a borrower's service provider.

8. The method of claim 1, wherein the compensation instructions comprises a multiplexer billing a borrower's credit card company or service.

9. The method of claim 1, further comprising providing an electronic token to facilitate the establishing or the compensation.

10. The method of claim 9, wherein the electronic token is an identification token containing no direct means for the compensation.

11. The method of claim 9, wherein the electronic token is a identification token which is authenticated through a service so as to provide the compensation instructions.

12. The method of claim 11, wherein the identification token has no value outside the ad hoc network.

13. The method of claim 11, wherein information in the identification token and a transaction receipt is passed back to a service provider of the at least one lender.

14. The method of claim 9, wherein the electronic token is a payment token containing externally recognized account information.

15. The method of claim 14, wherein the account information is at least one of a credit card account, a bank account, a payment service account, or an on-line payment service account.

16. The method of claim 1, further comprising authenticating a transaction associated with the compensation.

17. The method of claim 1, wherein the compensation instructions comprises providing a service a percentage of the compensation from the at least one lender.

18. The method of claim 1, wherein the compensation instructions is leveling payments which provides an equitable distribution of the compensation made by the borrower.

19. The method of claim 1, further comprising debiting an account of the borrower.

20. The method of claim 1, wherein the steps of claim 1 are provided by a service provider under a subscription and/or fee agreement and/or based on advertising content to one or more third parties.

21. The method of claim 1, wherein the compensation comprises a leveling payment between the at least one lender and a lender service provider and which provides an equitable distribution of the compensation made by the borrower.

22. The method of claim 21, wherein:
the leveling payment comprises a portion of a compensation that was paid directly to the at least one lender by the borrower; and
the leveling payment is made from the at least one lender to the lender service provider.

23. A method in which a service provider at least one of creates, maintains, deploys and supports a computer infrastructure that performs the steps of:
establishing an ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location; and
providing compensation instructions to compensate the at least one lender of bandwidth for lending the bandwidth to the borrower,
wherein the providing the compensation instructions comprises providing payment transfer strategies comprising billing one of the borrower, a service provider of the borrower, and a borrower's credit card company or service for bandwidth sharing in the ad-hoc network.

24. A method, comprising:
establishing an ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location;
providing compensation instructions to compensate the at least one lender of bandwidth for lending the bandwidth to the borrower;
setting a compensation schedule between the borrower and at least one lender of bandwidth; and
compensating the at least one lender of bandwidth for lending the bandwidth to the borrower based on the compensation schedule and the compensation instructions,
wherein the compensation instructions comprise payment transfer strategies for billing at least one of the borrower, a service provider for the borrower, and a credit card company of the borrower to compensate the lender for bandwidth sharing in the ad-hoc network, and
wherein the compensation is leveling payments between the at least one lender and a lender service provider and which provides an equitable distribution of the compensation made by the borrower.

25. The method of claim 24, wherein the compensation schedule includes one of:
the at least one lender directly billing the borrower;
a lender's service provider billing the borrower;
a lender's service provider billing a borrower's service provider; and
a multiplexer to one of directly billing the borrower or billing a borrower's service provider.

26. The method of claim 24, further comprising periodically reconciling overall bandwidth borrowing between service providers of the borrower and the at least one lender.

27. The method of claim 24, further comprising providing an electronic token to facilitate the compensation, wherein the electronic token one of:
(i) contains no direct means for compensation;
(ii) has no value outside the ad hoc network;
(iii) contains identification which is authenticated through a service so as to provide the compensation schedule; and
(iv) contains externally recognized account information.

28. The method of claim 27, wherein the account information is at least one of a credit card account, a bank account, a payment service account, or an on-line payment service account.

29. The method of claim 24, wherein the steps of claim 24 are provided by a service provider under a subscription and/or fee agreement and/or based on advertising content to one or more third parties.

30. The method of claim 24, further comprising periodically reconciling bandwidth allocations from service providers of the borrower and the at least one lender.

31. A method in which a service provider at least one of creates, maintains and supports a computer infrastructure that performs the steps of:
establishing an ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location;

providing compensation instructions to compensate the at least one lender of bandwidth for lending the bandwidth to the borrower;

setting a compensation schedule between the borrower and at least one lender of bandwidth; and compensating the at least one lender of bandwidth for lending the bandwidth to the borrower based on the compensation schedule and the compensation instructions, wherein the compensation instructions comprise payment transfer strategies for billing at least one of the borrower, a service provider for the borrower, and a credit card company of the borrower to compensate the lender for bandwidth sharing in the ad-hoc network, and wherein the compensation is leveling payments between the at least one lender and a lender service provider and which provides an equitable distribution of the compensation made by the borrower.

32. A method for providing a payment scheme in an ad hoc network, comprising:

providing a computer infrastructure being operable to:
establish an ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location;

provide compensation instructions to compensate the at least one lender of bandwidth for lending the bandwidth to the borrower; and compensate the at least one lender of bandwidth for lending the bandwidth to the borrower, wherein the compensation instructions comprise providing payment transfer strategies for bandwidth sharing in the ad-hoc network, and wherein the payment strategies comprises a lender's service provider billing the borrower to compensate the at least one lender of bandwidth for lending the bandwidth to the borrower.

33. A system comprising a server having a database containing data associated with one or more payment instructions for implementation in an ad-hoc network, and at least one of a hardware and software component for:

establishing the ad-hoc network between a borrower and at least one lender of bandwidth, wherein the ad hoc network is configured such that the borrower and the at least one lender are in communication with a central location via wireless telephony communication protocol, the at least one lender is in communication with the borrower via local wireless communication protocol, and the at least one lender selectively lends bandwidth to the borrower for downloading data from or uploading data to the central location;

providing compensation instructions to compensate the at least one lender of bandwidth for lending the bandwidth to the borrower; and compensating the at least one lender of bandwidth for lending the bandwidth to the borrower based on the one or more payment instructions, wherein the providing the compensation instructions comprises providing payment transfer strategies for bandwidth sharing in the ad-hoc network, the payment transfer strategies comprise an electronic token to facilitate the compensation, and the electronic token comprises one of: an identification token that is passed from the borrower to the at least one lender, and a payment token that is passed from the at least one lender to the borrower.

34. The system of claim 33, wherein the at least one of a hardware and software component is configured to one of:
permit the at least one lender to directly bill the borrower;
permit a lender's service provider to bill the borrower; and
permit a lender's service provider to bill a borrower's service provider.

35. The system of claim 33, wherein the at least one of a hardware and software component is configured to periodically reconcile overall bandwidth borrowing between service providers of the borrower and the at least one lender.

36. The system of claim 33, further comprising a multiplexer which directly bills the borrower or borrower's service provider based on the payment instructions and borrowed bandwidth.

37. The system of claim 36, wherein the multiplexer reconciles account information and notifies a service regarding a transaction between the at least one lender and the borrower.

38. The system of claim 33, wherein the at least one of a hardware and software component includes the electronic token to facilitate the compensation, wherein the electronic token one of:
(i) contains no direct means for compensation transfer;
(ii) has no value outside the bandwidth sharing system;
(iii) contains identification which is authenticated through a service so as to provide compensation instruction; and
(iv) contains externally recognized account information.

39. The system of claim 33, wherein a service provider at least one of creates, maintains, deploys and supports the at least one of a hardware and software component.

40. The system of claim 33, wherein the at least one of a hardware and software component resides on a server provided by a service provider.

41. A computer program product comprising a computer usable medium having readable program code embodied in the medium, the computer readable medium being an apparatus that stores the program code, the computer program product includes at least one component to:

establish an ad-hoc network between a borrower and at least one lender of bandwidth; and provide compensation instructions to compensate the at least one lender of bandwidth for lending the bandwidth to the borrower, wherein the compensation instructions comprise providing payment transfer strategies for bandwidth sharing in the ad-hoc network, and wherein the payment transfer strategies includes:
the at least one lender directly billing the borrower;
a lender's service provider billing the borrower;
a lender's service provider billing a borrower's service provider; and
a multiplexer to one of directly billing the borrower or billing a borrower's service provider.

* * * * *